United States Patent [19]
Stockford et al.

[11] 3,953,184
[45] Apr. 27, 1976

[54] CYCLONE-TYPE DUST SEPARATOR

[76] Inventors: William F. Stockford; Joseph M. Gamewell, both of P.O. Box 1430, Salisbury, N.C. 28144

[22] Filed: Sept. 18, 1974

[21] Appl. No.: 506,936

[52] U.S. Cl. ............................. 55/458; 55/459 B; 55/461; 55/459 D
[51] Int. Cl.² ..................... B01D 45/12; B04C 5/04
[58] Field of Search ............ 55/418, 449, 458, 459, 55/461; 209/144; 210/512 R

[56] References Cited
UNITED STATES PATENTS

| | | | |
|---|---|---|---|
| 394,240 | 12/1888 | Allington et al. | 209/144 |
| 476,524 | 6/1892 | Day | 55/458 |
| 590,033 | 9/1897 | Charlton | 55/458 |
| 1,344,146 | 6/1920 | Peck | 55/459 |
| 2,223,652 | 12/1940 | White | 55/461 X |
| 2,295,101 | 9/1942 | Dunham | 55/459 |
| 3,654,748 | 4/1972 | Bloom | 55/458 X |
| 3,745,752 | 7/1973 | Gallaer | 55/418 |

Primary Examiner—Frank W. Lutter
Assistant Examiner—Kathleen J. Prunner

[57] ABSTRACT

A dust contaminated air stream enters a cyclone-type dust separator having a curved outer wall and follows a path that spirals downwardly and inwardly. The primary air stream, which occurs during the first revolution, is separated from the subsequently occurring secondary air stream by an inner wall or baffle in the form of a curved member extending inwardly into the separator approximately one-half revolution along a path generally paralleling said air stream and defined by a continuously decreasing radius. The inner wall terminates at the dust separation point, which is also the turning point of the air stream. The inner wall and corresponding portion of the outer wall converge slightly to cause an acceleration of the primary air stream. A discharge cylinder extends downwardly through the top of the separator into the interior thereof and has a lower edge or inlet at a point in substantially the same horizontal plane as the above-mentioned turning point of the air stream.

1 Claim, 3 Drawing Figures

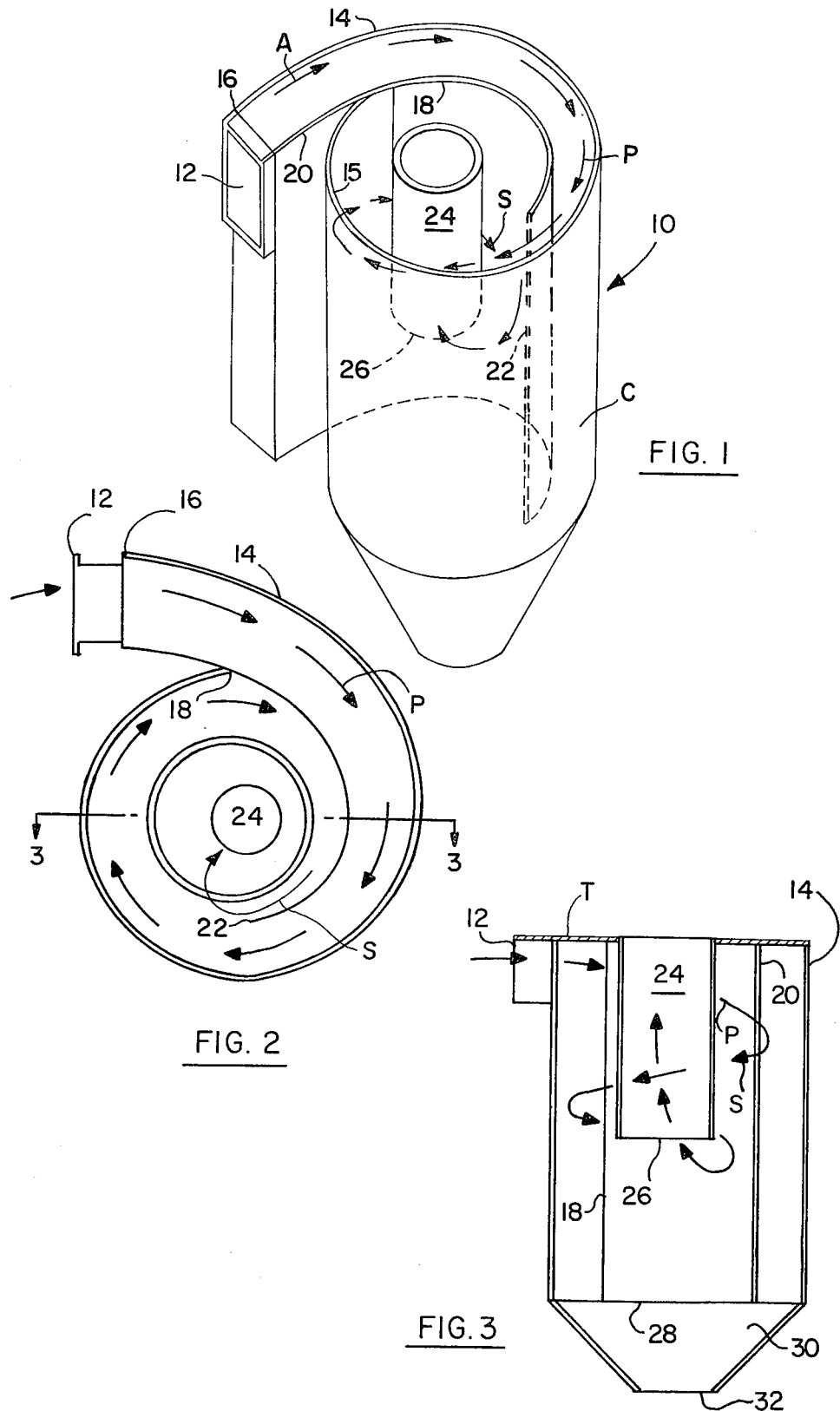

CYCLONE-TYPE DUST SEPARATOR

BACKGROUND OF THE DISCLOSURE

The elimination of dust particles or other impurities from the air within industrial plants or other areas where the air becomes contaminated by sawdust, larger wood chips, metal filings, or the like is increasingly important in modern industry. In addition to the economic necessity of minimizing the expense of contaminated air, ecologists are demanding maximum purification of air before it is released back into the atmosphere.

There are several known types of dust eliminators or separators, and the cyclone-type separator is generally considered to be one of the more efficient and less expensive types. In known types of cyclone separators, a contaminated air stream generally enters a cylindrical chamber tangentially through an upper inlet and follows a helical, downwardly inclined path. The heavier dust particles are urged to the outside wall by centrifugal force, whereupon the force of gravity pulls the dust particles down the walls and through a conical lower portion into a receptacle when the velocity of the air stream falls to such an extent that the dust particles are no longer entrained therein. The clean air, after separation turns and exits through a discharge cylinder which extends down from above into the separation chamber.

One problem that occurs in such types of separators is that after the air stream makes one revolution, the dust already separated becomes reentrained in the subsequent air stream which tends to keep it suspended within the separator, rather than falling out the bottom. In such types of separators, the air stream continues in its helical path down into the lower areas of the separator, with the result that some of the air that is discharged through the discharge cylinder and out the top includes dust entrained therein, and some of the dust which escapes through the bottom also includes part of the air stream which is deleterious to the separating process.

Also, where the air stream which initially enters the separator is at a high velocity, the diameter and length of the separator must be relatively large in order that complete separation occurs without reentrainment of the dust into the existing clean air.

SUMMARY OF THE PRESENT INVENTION

The present invention, on the other hand, is directed to an apparatus which induces an entirely new and unique pattern of air flow within the chamber. In this regard, the outer wall of the separation chamber does not follow the conventional cylindrical path, rather said outer wall follows an arcuate path curving inwardly through an arc defined by a continuously decreasing radius. Additionally, an inner wall or baffle extends from the trailing edge of the outer wall inwardly into the separation chamber and also follows a curved, arcuate path defined by a continuously decreasing radius.

Such construction forms a dual purpose. First of all the continuously decreasing radius of the air stream causes an increase in velocity of the air stream which facilitates the separation process. Further, the inner wall or baffle separates the entering or primary air stream of the first revolution from the secondary air stream of the second revolution, which is considerably increased in velocity.

The discharge cylinder of the apparatus extends through the top wall of the separation chamber down into the interior thereof to a point on the same horizontal plane that the air stream has reached after one and a half revolutions or until the terminus of the inner wall has been reached.

The inner wall or baffle extends approximately one-half revolution to a terminus which has been found to be sufficient, so that after the air stream has made approximately one and one-half revolutions, the secondary air stream is induced to turn upwardly. This point is referred to hereinafter as the turning point, and is caused by a combination of the normal vortex effect and the vacuum created by the positioning of the discharge cylinder at such a point that the lower edge or inlet thereof is at a point approximately on the same horizontal plane as this turning point. Therefore the secondary air stream turns toward the inside and escapes through the discharge cylinder. At the same time, the dust and heavier particles are flung outwardly by centrifugal force into contact with the outer wall to facilitate and improve the separation process.

The separator of the present invention therefore improves the efficiency of separation and allows separators for high velocity air streams to be smaller than those heretofore known, since the air path only follows about one and a half revolutions before it is induced to turn upwardly and exit through the discharge cylinder. Also the air stream has achieved such a speed that the primary and secondary air stream prevents reentrainment of the dust particles in the secondary air stream. The key to the operation of the device according to the present invention is that the separator walls are so constructed, and terminal edge of the inner wall and the inlet of the discharge cylinder are so located within the separation chamber that the dust separation point and turning point of the air stream occur simultaneously.

It is therefore an object of the present invention to provide an improved cyclone-type dust separator which induces contaminated, high velocity air streams to undergo the separation process with a much smaller apparatus than heretofore known.

It is a further object of the present invention to provide an apparatus of the type described having a higher efficiency than apparatuses of the same size heretofore known.

It is yet a further object of the present invention to provide an apparatus of the type described wherein the turning point of the air stream and the dust separation point occur simultaneously.

Other objects and a further understanding of the invention will become apparent after reading the following specification along with the accompanying drawings in which:

FIG. 1 is a perspective view of the apparatus according to the present invention;

FIG. 2 is a plan view of the apparatus illustrated in FIG. 1 with the top cover of the apparatus removed for the sake of clarity;

FIG. 3 is a sectional view taken substantially along lines 3—3 in FIG. 2.

Turning now to a detailed description of the apparatus, and referring to FIGS. 1–3, the improved dust separator 10 is generally of the cyclone-type in which the dust contaminated entering air stream A enters an inlet 12 generally tangential to and at the upper end of separator 10 and follows a downwardly spiraling or generally helical path that also curves inwardly in a path defined by a continuously decreasing radius. A primary air stream P is developed during the first revolution of the air stream which becomes a secondary air stream during the second revolution that is spaced radially inwardly from said primary air stream P. The apparatus is so designed that the primary air stream makes a full revolution and the secondary air stream makes approximately another one-half revolution before turning upwardly and exiting through the discharge cylinder 24 of the apparatus. Further, the apparatus is so designed that the turning point of the air stream and the dust separation point, which is the point at which the dust begins to fall outwardly and downwardly from the air stream occur at the same point.

In this regard, the apparatus includes a pair of walls 14, 20 with the outer wall 14 commencing at a starting point 16 adjacent the inlet 12 of the separator 10. Outer wall 14 continues around a curved path through an arc defined by a continuously decreasing radius to a trailing edge 18 in engagement with inner wall 20 substantially adjacent said inlet 12. The outer wall forms the outer periphery of the primary air stream.

The inner wall or baffle 20 also commences at a starting point 16 adjacent inlet 12 at a point spaced radially inwardly from the beginning point of wall 14 and curves inwardly through an arc defined by a continuously decreasing radius into the interior of the separating chamber C, the outer wall of which is formed by wall 14. Baffle 20 extends past the trailing edge 18 of outer wall 14 throughout approximately one-half revolution, and it should be noted that the radius of baffle 20 decreases at a slower rate than that of outer wall 14 so that walls 14 and 20 converge as the primary air path approaches the terminal edge 22 of inner wall 20. This tends to speed up the primary air path to some extent so that the separation of the dust and particles will occur at an earlier point, and the turning point of the air stream can be moved up the separator 10 considerably. This is one of the reasons that the separator according to the present invention can be made smaller and more compact than those previously known. The decreasing radius of outer wall 14 and also inner wall 20 also cause an increase in the velocity of the air stream adjacent the wall.

Inner wall 20 divides the primary air stream P from the secondary air stream S, whereby dust particles initially removed from the primary air stream will not be reentrained in the cleaner secondary air stream. Walls 14 and 20 are both of substantially the same vertical dimension and extend throughout the upper portion of the separator down past the inlet 26 of discharge cylinder 24 to a level in plane 28 where the conical lower portion 30, which is conventional with cyclone-type separators, begins. An outlet 32 forms the lower edge of conical section 20 through which dust and particles collected may be removed from the separator into a suitable receptacle (not shown).

A discharge cylinder 24 extends downwardly from a point above the top wall T of the separator, through the top wall along an axis parallel to the axis of enclosure 10 and into the interior of the area between inner wall 20 and the opposed portion 15 of outer wall 14. The other end (not shown) of the discharge cylinder is connected to a conduit through which purified air is returned into an enclosure. A fan is positioned within the aforementioned conduit to create a vacuum at the lower end 26 of discharge cylinder 24 which helps to pull the secondary air stream upwardly thereinto, thereby partially, at least, creating the turning point location as prescribed. The lower end 26 of the discharge cylinder is positioned at a point on a level with the turning point of the secondary air path S and also at the separation point which occurs at the terminal edge 22 of inner wall 20.

In operation, the contaminated air A enters the inlet 12 and is directed into the area between outer wall 14 and inner wall 20, thus forming the primary air stream P. When the point of intersection (trailing edge 18) between outer wall 14 and inner wall 20 is reached, after one revolution, the secondary air stream there formed is separated from the primary air stream by the inner wall or baffle 20. When the secondary air stream S has reached the terminal edge 22 of inner wall 20, it has made approximately one and one-half revolutions of the separation chamber C and has reached such a velocity that when the air is released across terminal edge 22, the secondary air stream S will continue in its spiraling path, and the dust and other particulate matter will be separated therefrom and flung against the outer wall 14, where it falls by gravity down through conical portion 30 and out through outlet 32.

Simultaneously, and at this separation point, the speed of the secondary air stream S and its continuously decreasing path creates a vortex type situation, which, when combined with the vacuum placed thereon at the lower end 26 of discharge cylinder 24 causes the secondary air stream to turn from its downwardly inclined path to an upwardly inclined path, whereupon it enters the inlet 26 of discharge cylinder and is drawn off as clean air to be further treated or return to an enclosure.

The important features of the present invention are that the entering air stream not only spirals downwardly but also is conducted through a gradually decreasing arcuate path which increases in velocity. Also, the primary air stream and secondary air stream are kept separated. Finally, and significantly, the inlet 26 of discharge cylinder 24 is so positioned with respect to the turning point of the secondary air path that the vacuum there induced combined with the speed and vortex effect of the secondary air path cause the secondary air path to turn and proceed upwardly through the discharge cylinder 24. At the same point or the turning point, the terminal edge 22 of inner wall 20 is positioned to also create the separation point where the dust is flung outwardly from the air stream as the air stream turns inwardly and up to the discharge cylinder.

It is obvious that various changes and modifications might be made to the detailed embodiment described hereinabove without departing from the scope of the invention which is set forth in the accompanying claims.

What is claimed is:

1. A cyclonic dust separator of the type including a top wall, a conical shaped lower portion having a discharge opening at the lower end, an intermediate separation chamber joining the top wall and lower portion, and a discharge cylinder extending through said top wall and downwardly into said separation chamber, wherein the entering contaminated air stream is directed into a vortex and caused to turn at a turning point and exit through said discharge cylinder, said separation chamber comprising:

a. an outer wall extending for approximately one revolution in an arcuate path defined by a continuously decreasing radius to a trailing edge spaced from the initial portion of said outer wall;

b. an inner wall extending from said trailing edge inwardly into said chamber along an arcuate path spaced from said outer wall and defined by a continuously decreasing radius to a terminal edge defining a dust separation point;

c. an inlet opening between said outer wall and said trailing edge for directing an air path horizontally into said separation chamber between said outer and inner walls;

d. said continuously decreasing radius of said inner wall decreasing at a rate slower than the corresponding radius decrease of said outer wall, to define a converging air path which increases the velocity of said air stream;

e. said terminal edge of said inner wall being positioned approximately one-half revolution beyond said trailing edge; and f. the inner wall being of substantially the same vertical dimension as said outer wall, the lower edge of said inner and outer walls extending to a level below the lower end of said discharge cylinder.

* * * * *